United States Patent [19]
Calvin et al.

[11] Patent Number: 5,244,183
[45] Date of Patent: Sep. 14, 1993

[54] FUGITIVE EMISSION SEALING ASSEMBLY

[75] Inventors: Douglas G. Calvin, Missouri City; Edward G. Holtgraver, Spring, both of Tex.

[73] Assignee: Keystone International Holdings Corp., Houston, Tex.

[21] Appl. No.: 771,494

[22] Filed: Oct. 4, 1991

Related U.S. Application Data

[63] Continuation-in-part of Ser. No. 672,383, Mar. 20, 1991, abandoned.

[51] Int. Cl.⁵ .................... F16K 43/00; G01M 3/28
[52] U.S. Cl. .......................... 251/214; 73/46; 137/312; 137/315; 222/108; 277/2; 277/72 FM
[58] Field of Search .............. 137/246.16, 246.22, 137/312, 315; 73/40, 46; 251/214, 291, 355, 292; 277/2, 15, 17, 19, 21, 72 FM; 222/108

[56] References Cited

U.S. PATENT DOCUMENTS

| Re. 29,679 | 6/1978 | Boitnott | 251/214 |
|---|---|---|---|
| 2,155,628 | 4/1939 | Williams | 277/17 |
| 3,544,064 | 12/1970 | Carlin | 251/214 |
| 3,627,260 | 12/1971 | Grove | 251/214 |
| 3,815,925 | 6/1974 | Mattoon | 277/2 |
| 3,958,592 | 5/1976 | Wells et al. | 251/63.6 |
| 3,972,396 | 8/1976 | Bochnak | 277/2 |
| 3,979,104 | 9/1976 | La Coste et al. | 251/214 |
| 4,174,728 | 11/1979 | Usnick et al. | 137/240 |
| 4,177,998 | 12/1979 | Laitkep et al. | 277/72 FM |
| 4,230,299 | 10/1980 | Pierce, Jr. | 251/214 |
| 4,289,157 | 9/1981 | McGee | 251/214 |
| 4,340,204 | 7/1982 | Herd | 251/214 |
| 4,364,542 | 12/1982 | Meyer | 251/214 |
| 4,383,546 | 5/1983 | Walters, Jr. | 137/240 |
| 4,537,385 | 8/1985 | Bragg et al. | 251/214 |
| 4,575,101 | 3/1986 | Hopkins | 137/246.16 |
| 4,616,673 | 10/1986 | Bondar | 251/291 |
| 4,633,897 | 1/1987 | Effenberger | 251/292 |
| 4,719,939 | 1/1988 | Killian | 251/292 |
| 4,744,386 | 5/1988 | Frazer | 251/63.6 |
| 4,794,945 | 1/1989 | Reback | 251/291 |
| 4,813,648 | 3/1989 | Walton et al. | 251/214 |
| 4,972,867 | 11/1990 | Ruesch | 251/214 |

Primary Examiner—George L. Walton
Attorney, Agent, or Firm—Browning, Bushman, Anderson & Brookhart

[57] ABSTRACT

A sealing assembly, usable with a valve or the like, having a movable shaft within a main housing and controlling a product under a first pressure. A cartridge housing forms a continuation of the main housing. An extension of the shaft extends through the cartridge housing and forms an annulus therewith. Spaced first and second annular seals movably seal the annulus between the shaft extension and the cartridge housing, forming a central sealing chamber. An injector introduces sealing medium into the central sealing chamber under a pressure higher than the product pressure. An accumulator receives excess sealing medium from the central sealing chamber, and can also be associated with monitoring means. Additional annular seals may form additional chambers spaced along the shaft, and these chambers may likewise be used for injection of sealing media and/or monitoring and/or leak detection.

39 Claims, 5 Drawing Sheets

FUGITIVE EMISSION SEALING ASSEMBLY

CROSS REFERENCE TO RELATED APPLICATION

This is a continuation-in-part of U.S. application Ser. No. 672/383, filed Mar. 20, 1991, now abandoned.

BACKGROUND OF THE INVENTION

1. Field of the Invention

The present invention relates generally to rotary shaft sealing and, more particularly, is concerned with an adaptable sealing mechanism useful for providing zero emission leakage around the shaft in a wide variety of valves.

2. Description of the Background

In the valve industry, one of the major problems encountered is leakage of process product to the atmosphere through the stem area. Stem seals begin to leak over time due to a number of reasons including compression set, loss of energization, contamination from the milieu, compound aging, and elastomer compound breakdown.

Leakage at some minute level is always exhibited through any packing and is becoming an ever increasing concern and expense from the environmental regulatory standpoint. State and Federal regulations have in the past required BACT (best available control technology) standards on new sources of regulated emissions and RACT (reasonably available control technology) standards on existing sources. The regulatory standards have changed a great deal over the past decades and more recently generally require greater reductions of emissions with less regard to economic costs required for conformity.

Previous patents have addressed various environmental concerns in the area of shaft seals. U.S. Pat. No. 3,979,104 to B. L. La Coste shows a method for controlling leakage of radioactive steam along the stems of valves used in nuclear power plants. The La Coste device utilizes a flexible double bellows sealing arrangement with a seal chamber disposed between the contaminated steam and a low pressurized gland condenser. A buffer layer of uncontaminated steam having a pressure higher than the pressure of the contaminated steam is introduced into the seal chamber through a conduit to maintain zero leakage of contaminated steam into the low pressure gland condenser. For general use in controlling valve stem leakage, this device appears to have a number of serious problems. It is designed to be built into the valve housing so that it is of little value for the many valves that are already in operation. The seal is somewhat bulky and complicated to be useful for inclusion in many new valves. It is suitable only with a steam or gaseous sealing medium. Furthermore, if the seal fails, there appears to be little available warning of the failure and there is no provision for additional contingency sealing when the fault is detected.

U.S. Pat. No. 4,972,867 to J. O. Ruesch shows a housing for placement over the valve stem area of a valve. This housing contains a back-up seal and sensors to provide a warning that leakage past the primary seal has occurred. Additionally the Ruesch device includes a drain tube from the housing so leakage can be stored rather than spilled. The Ruesch device provides no means for interacting with the primary seal of the valve to improve the original primary sealing in any way. Also, should the Ruesch device secondary seal leak prior to the time when repair is effected, there appears to be no way to prevent emission leakage.

U.S. Pat. No. 4,537,385 to D. D. Brag uses inner and outer metal bellows to transmit the pressure of the controlled product behind the primary seal to produce a near zero pressure differential across the primary seal thereby allowing the primary seal elements to float so as to have little wear. The main pressure differential is across the secondary seal. This valve is used in compliance with EPA standards for VOC (volatile organic compound) emissions but is somewhat bulky and complicated for general use with a wide variety of valves.

Various other patents, such as U.S. Pat. No. 4,364,542 to Meyer, provide means for injecting highly viscous fluids including semi-fluid plastic material for actuating sealing elements for seals which generally depend on the viscous nature of the semi-fluid material itself as a seal. These seals provide no way to eliminate all leakage and there is no mechanism for providing a warning if the seals should begin to leak.

Consequently, a need exists for improvements in rotary shaft seals which will result in greater versatility, reliability and dependability of operation at reduced levels of capital investment.

SUMMARY OF THE INVENTION

The present invention provides a sealing means useful in a wide variety of valves and capable of providing zero emission leakage sealing. In preferred embodiments, the mechanism is relatively uncomplicated. A pressurized zone may remain charged and at the correct pressure in spite of temperature variations, and monitoring and/or sealing is available in a number of zones within the apparatus.

The invention can be provided in a retrofit cartridge form whereby manufacturing costs are generally reduced because the same housing and related components can be used with a large variety of valves.

Many objectives, features, and advantages of the present invention will be readily apparent to one skilled in the art.

The present invention provides a versatile, zero emission leakage sealing assembly which may be in cartridge form, for retrofitting existing valves, or may be designed into a valve housing. In the cartridge format, the seal can be added to a wide variety of valves, typically by changing only a flange and possibly also a shaft adapter to match the particular valve type. Preferred embodiments of the present invention generally provide three different pressure zones which can be used for control of pressure and/or for monitoring leakage. In one preferred embodiment, three standard seals, which may utilize various seal types are used in conjunction with the valve primary seal to create three pressure zones. If the valve is a rotary actuated type, the three standard seals are rotary. Sealing is also available by providing sealing medium at a buffer pressure within one or more of the pressure zones. Leakage cannot occur from a lower pressure area to a higher pressure area. Therefore, individual or combinations of the pressure zones may be pressurized via ports to a pressure higher than the valve product pressure to insure no product leakage through respective valve seals.

A seal created by this method is generally independent of the sealing medium used. This feature of independence of the sealing medium allows additional versatility, for instance, when it is absolutely necessary not to contaminate the product under control. In such a case, a material compatible with, but at a higher pressure, than the controlled product could be used in the first zone. The second zone could contain a highly viscous, easily sealable medium, also at a pressure higher than the product pressure. One of the zones, e.g. the final zone, may contain a sensor for detecting leakage should it occur and allow for contingency sealing by injecting pressurized sealing medium if necessary. As can be seen, this device would allow engineers who design facilities which require compliance to environmental standards a great deal of flexibility as to any system of emission control.

An accumulator may also be provided to effect a simple means for maintaining a full charge of sealing medium in the pressure zones at the correct pressure while additionally providing a backup supply of sealing medium and a means for taking up and adding sealing medium accounting for temperature expansion and contraction. The accumulator, in the preferred embodiments, includes a spring biased piston in a bore which is filled with sealing medium. If the supply of sealing medium decreases for any reason, the piston will move an indicator, providing warning that an appropriate action should be taken.

In summary, the preferred embodiment of the present invention provides a useful and versatile mechanism for compliance with regulatory standards, adaptable to a wide variety of valves.

DETAILED DESCRIPTION OF THE PREFERRED EMBODIMENTS

Figure 2:
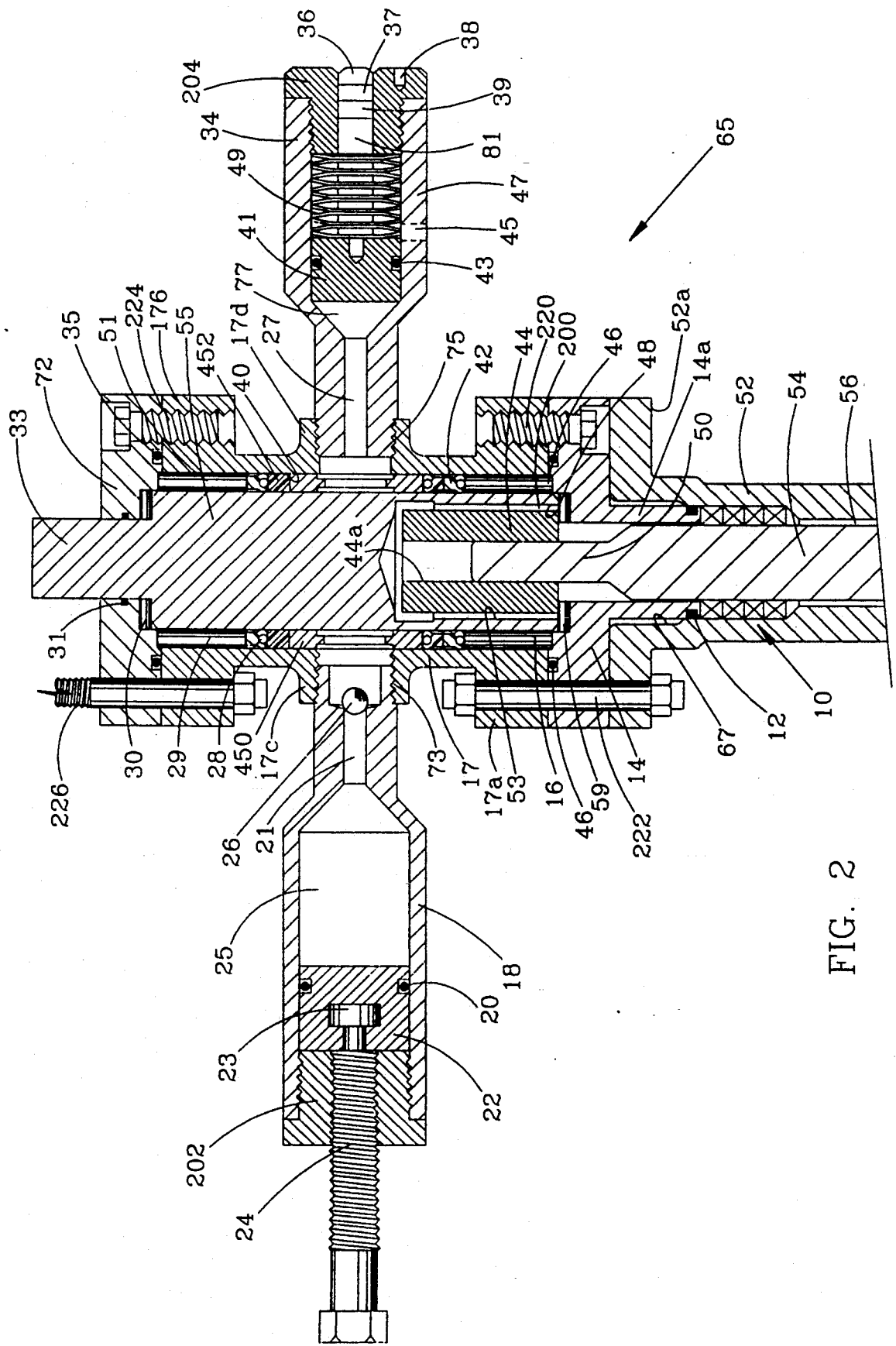
FIG. 2 is an enlarged side elevational view, in section, showing the embodiment of FIG. 1.

Referring now to the drawings, and more particularly to FIG. 2, there is shown a cartridge type shaft seal apparatus, generally designated 65, which represents a first embodiment of the present invention for use with rotary valves such as butterfly valves. Shaft seal apparatus 65 generally includes cartridge housing 17, injector housing 18, and accumulator housing 34. Valve shaft 54 has an input portion 50 connected in any suitable manner to valve shaft adaptor 44 of the cartridge for joint rotation. For example, shaft portion 50 may be disposed in a central bore 44a of adaptor 44, and shaft portion 50 and bore 44a may have mating non-circular transverse cross sections. Adaptor 44 is secured within first socket 53 of rotatable member 55 for rotation therewith as by splines 200. Valve shaft adaptor 44 is generally removable so that a wide variety of valve shafts can be accommodated with shaft seal apparatus 65 by providing a suitable valve shaft adaptor, such as valve shaft adaptor 44, for each type of valve shaft, respectively.

Cartridge housing 17 contains bearings 16 and 29 which facilitate movement of rotatable member 55. A thrust bearing 30 is provided to allow use of shaft seal apparatus 65 with thrust loads.

Figure 1:
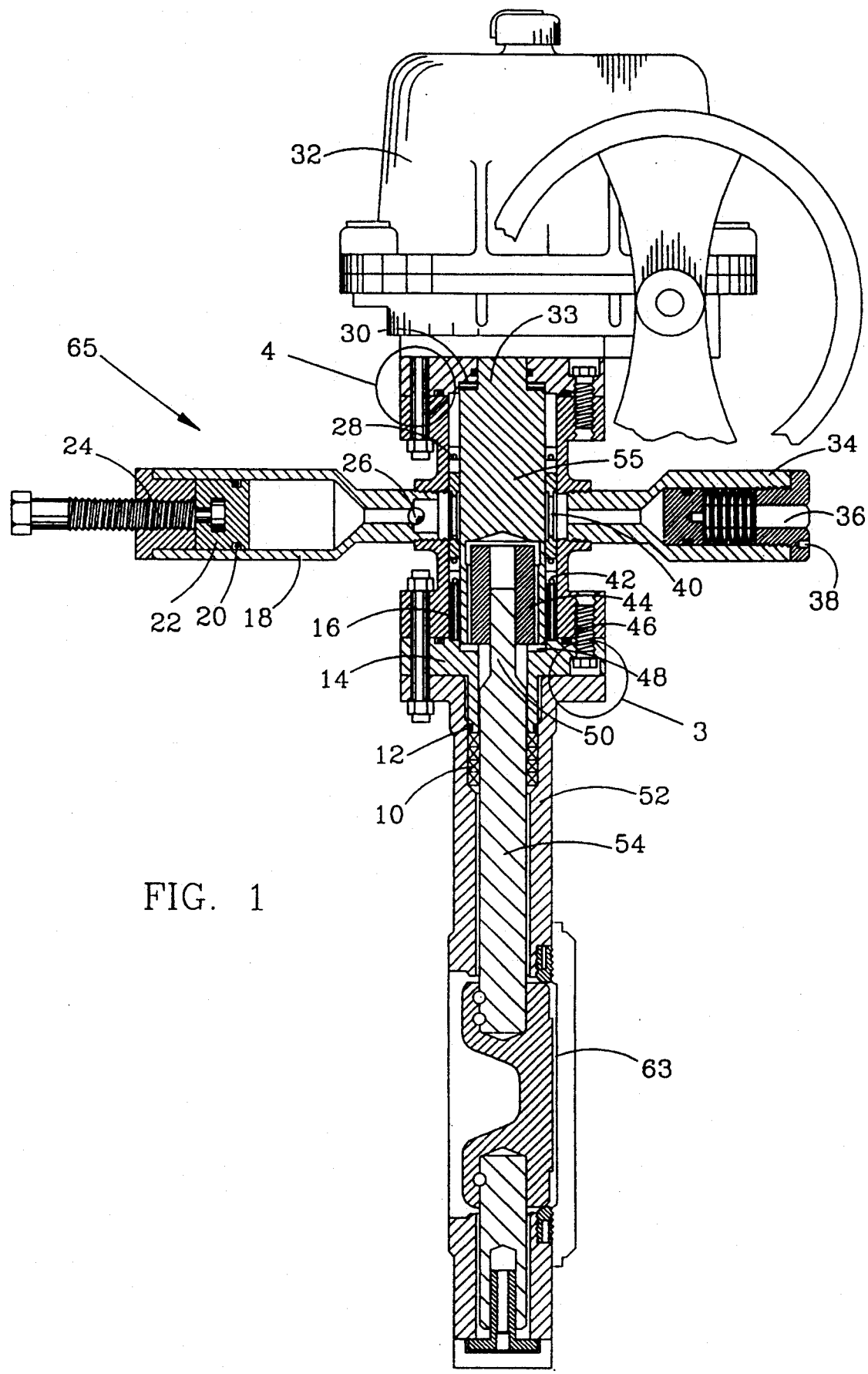
FIG. 1 is a side elevational view, partially in section, showing a first embodiment of the present invention disposed between a rotary valve and a valve actuator.

FIG. 1 shows shaft seal apparatus 65 between valve housing 52 and actuator 32. Rotatable member 55 connects to actuator 32 through output shaft portion 33. Instead of automated actuator 32, of course, the valve may be provided with a manual actuating device. Actuator 32 rotates valve 63 through shaft seal apparatus 65.

In FIG. 2, primary shaft seal 10, located in a niche portion of valve housing neck 52 seals product pressure at pressure zone 56 inside valve housing 52, along valve shaft 54. "Seal" 10 actually comprises a stack of four seal rings, of any suitable type, shown generically in the drawing. A static seal such as o-ring 12 prevents leakage between valve housing 52 and annular flange 14 of the sealing cartridge. Flange 14 is removably attached to flange portion 17a of cartridge housing 17 as by screws 220 and can therefore be replaced so as to make seal apparatus 65 adaptable to a wide variety of valve housings. As shown, flange 14 has a downwardly depending central cylindrical part 14a which extends into valve packing bore 67, but flange 14 could also be exchanged to adapt to seal axially against valve flanges. Bolts 222 removably secure flanges 17a and 14 of the cartridge body to annular valve flange 52a which extends outwardly from the top of neck 52.

Static seal 46 prevents leakage between flange 14 and cartridge housing 17. Static seal 35 prevents leakage between cartridge housing 17 and actuator flange 72. In general, static seals 12, 35, and 46 provide a reliable and effective seal against leakage of product pressure from pressure zone 56. This is in contrast to rotary or otherwise movable seals which are more likely to have leakage problems.

First output seal 28 and first input seal 42 (a stack of two seal rings) provide rotary sealing between rotatable member 55 and cartridge housing 17 in the annulus formed between rotatable member 55 and the inner walls of cartridge housing 17. The structure of apparatus 65 is such that first output seal 28 and first input seal 42 may utilize various seal types such as elastomer chevron seals as shown, halogenated polymer v-rings with internal springs, graphoil, etc. Second output seal 31 also provides rotary sealing for output shaft portion 33 and, though shown as an o-ring, could utilize various types of seals by changing actuator flange 72. Actuator flange 72, like flange 14, is removable so that various actuators can be used with seal apparatus 65 by changing actuator flange 72. Screws 224 secure flange 72 to adjacent flange portion 17b of cartridge housing 17, and bolts 226 secure both of these cartridge flanges to the actuator housing.

Figure 3:
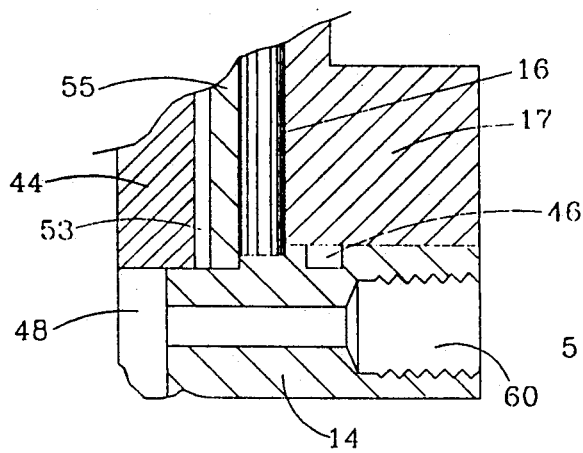
FIG. 3 is an enlarged side elevational view, in section, of the portion of the apparatus in circle 3 of FIG. 1, but taken perpendicular to the plane of FIG. 1, showing a port to a pressure zone adjacent to the valve primary seal.
Figure 6:
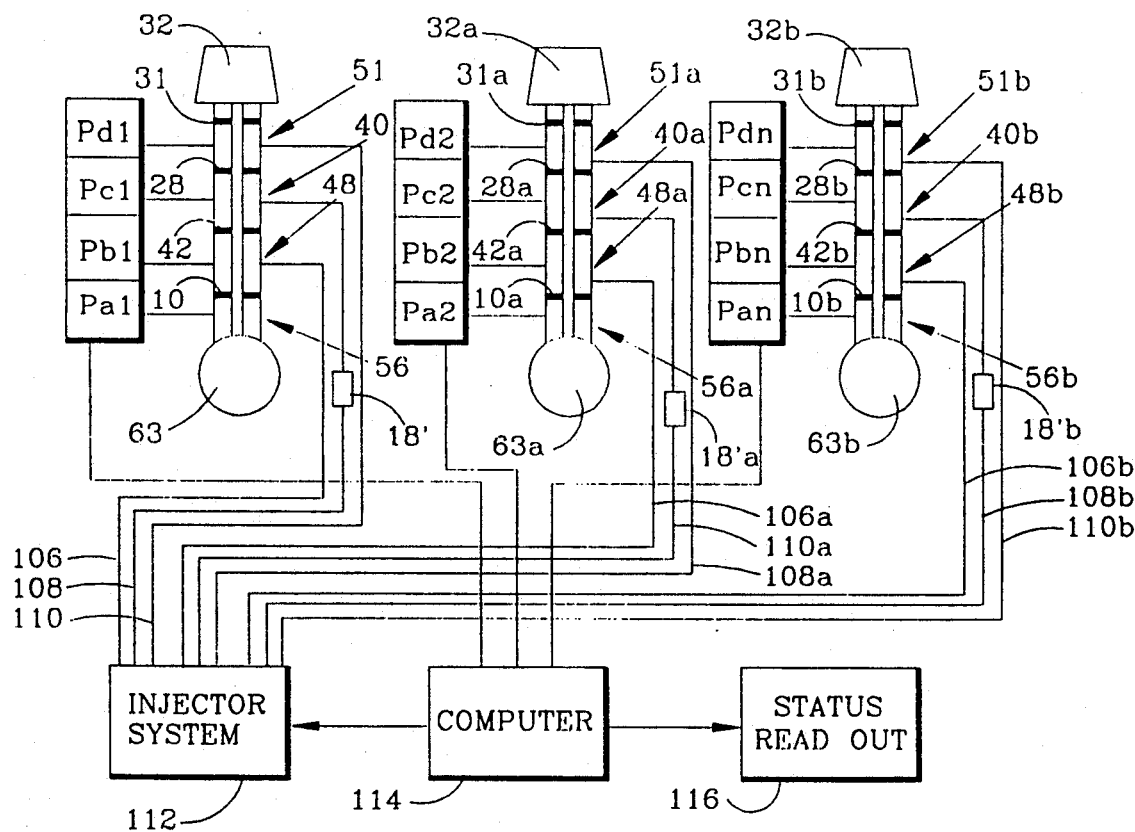
FIG. 6 is a schematic diagram of an emission control system incorporating the present invention.

In between the four rotary seals 10, 28, 42, and 31, three pressure zones 48, 40, and 51 are formed, in addition to the product zone 56. In FIG. 3, there is shown radial port 60 in flange 14, communicating with first pressure zone 48 formed between primary seal 10 and first input seal 42. Port 60 is disposed 90° from the ports 73 and 75 to which injector 18 and accumulator 34 are connected, and a further radial port (not shown) may be formed in flange 14 diametrically opposite port 60. As indicated in FIG. 6, a pressure sensor Pa1 may be communicated, in well-known manner, with product zone 56. Another pressure sensor Pb1 may be communicated with first pressure zone 48 through bore 60. Thus the differential pressure between these zones may be determined. If the pressure in pressure zone 56 is lower than that of pressure zone 48, we can surmise that zero product leakage occurs past primary seal 10 into pressure zone 48. Port 60 could also be utilized with other types of sensors to indicate product leakage as desired. Alternatively, port 60 and its opposite port could, respectively, mount an injector 18 and an accumulator 34, as described below. In installations in which port 60 and/or its opposite port are not used for mounting sensor, injectors, accumulators, etc., the unused ports are plugged.

First input seal 42 and first output seal 28 form a central sealing chamber pressure zone 40. A third pressure zone 51 is created between first output seal 28 and second output seal 31.

Figure 4:
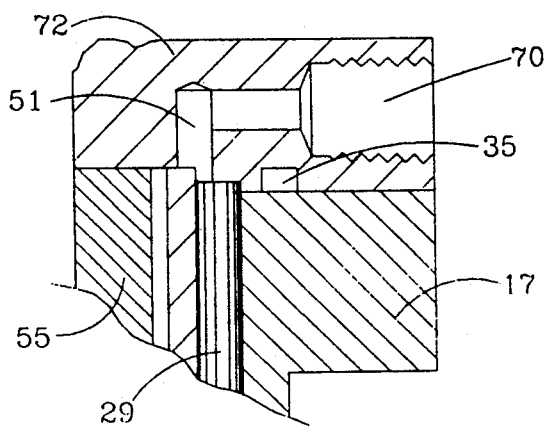
FIG. 4 is an enlarged side elevational view, in section, of the portion of the apparatus in circle 4 of FIG. 1, but taken perpendicular to the plane of FIG. 1, showing a port to a pressure zone between the central sealing chamber and the stem connection to the FIG. 5 is a side elevational view, in section, showing an alternative embodiment providing coupling for the valve actuator.

FIG. 4 shows a radial port 70 in actuator flange 72 and communicating with third pressure zone 51. Like port 60, port 70 is disposed at right angles to ports 73 and 75 and may be diametrically opposed by another port (not shown) for purposes similar to those described above in connection with the radial port 60 in flange 14.

The various rotary seals 10, 42, 28, 31 may be substantially activated by sealing medium injected into the various respective pressure zones. However, it is a desirable feature of some preferred embodiments that the seals be activated substantially independently from the pressurized sealing medium using, for example by virtue of the elastomeric material and chevron shape or by metal springs, depending on the particular applications in which the sealing apparatus 65 is to be used.

One or more of the three pressure zones 48, 40, and 51 can be used to effect zero emission leakage sealing across the rotatable seals 10, 42, and 28. This is due to the principle that leakage cannot occur between fluid or product at a lower pressure into a higher pressure area. Therefore, in operation, any combination of pressure zones 48, 40, and 51 can be pressure charged with a sealing medium at a higher pressure than that of product pressure zone 56 to effect zero emission leakage across respective seals 10, 42, and 28. It will be appreciated that, if the pressure in the product pressure zone 56 is known to be lower than the pressure in a pressure zone, zero emission leakage across the respective seal can be assured.

In the embodiment shown, only the central zone 40 is pressure charged, by injector 18 to be described below. However, such an injector could be associated with ports 60 and/or 70, as desired, to charge one or both of the other zones 48, 51 instead of, or in addition to, zone 40.

Injector housing 18 and accumulator housing 34 provide an example of a means for charging a pressure zone. They connect to central chamber pressure zone 40 through threaded lateral bores 73 and 75 formed in laterally projecting fittings 17c and 17d intragally formed on housing 17. Bores 73 and 75 respectively receive reduced diameter portions of housings 18 and 34 which form respective ports 21 and 27. A lantern ring 450 is disposed in housing 17 in alignment with bores 73 and 75. A spacer ring 452, permitting fluid flow therepast, may be interposed between the top of lantern ring 450 and the bottom of seal ring 28.

Referring to the injector 18 etc., a sealing medium, as described hereinafter, is contained in injector chamber 25. Injector shaft 24 is threaded into the outer end closure member 202, which in turn is threaded into housing 18. Shaft 24 terminates in an inner slip portion 23, which is received in piston 22. When shaft 24 is rotated in one direction, e.g. counter-clockwise, it moves inwardly, carrying piston 22 with it, to push sealing medium in injector chamber 25 into central sealing chamber pressure zone 40 through port 21 past check valve ball 26. Suitable means (not shown) would be provided to retain ball 26 in housing 18, as well known in the art. Sealing medium is prevented from flowing past piston 22 by seal 20.

It is understood that injector shaft 24 could be replaced by an air or nitrogen supply which could be activated from a control room, automatically or manually, and regulated at a desired pressure which is higher than the product pressure. A compressed gas supply canister could also be built into some part of apparatus 65 or be separate and used in the vicinity therewith.

As sealing medium fills central sealing chamber pressure zone 40, the excess sealing medium flows into accumulator chamber 77. A piston 41 in chamber 77 is connected to shaft 81, slidably mounted in end closure 204. Sealing medium eventually pushes piston 41, which is sealed in accumulator housing 34 by O-ring 43, until ring 39, on shaft 81 connected to piston 41, is visible. Ring 39 may, for example, be colored green to indicate a full charge of sealing medium. If leakage of charge should occur, ring 37, which may be colored yellow, could provide a visual caution sign. Ring 36 may be colored red to indicate charge of the pressure zone is required when only red ring 36 is showing. Screw thread hole 38 is provided in outer end closure member 204 so that an electronic sensor (not shown) could be connected. Such a device could sense the position of shaft 81, and a signal concerning charge condition could be sent to a control room.

Spring 49 provides a biasing means which will provide a pressure in seal chamber pressure zone 40 and is generally chosen to provide a pressure higher than the expected product pressure. Spring 49, in preferred embodiments, is designed to provide a constant pressure on piston 41 as piston 41 moves in chamber 77. Therefore, if expansion or contraction of sealing medium occurs due to temperature variations, the pressure in central sealing chamber 40 will remain constant. Due to the foregoing reasons, an electronic sensor attached at screw thread 38 could provide an indication of both charge condition (quantity) and pressure because the pressure in central sealing chamber 40 will be equal to the force of bias spring 49 regardless of displacement (unless sufficient charge has leaked out, at which time displacement of piston 41 will be at its minimum). Of course, many other biasing means, as known in the art, e.g. hydraulic or air pressure means, could be used in place of spring 49. Pressure bleed hole 45 is provided to prevent overpressurization of central seal chamber 40. If the pressure is too high, seal 43 of piston 41 will move past (to the right of) hole 45, but then pressure will bleed through hole 45 until it is reduced to a value allowing spring 49 to return seal 43 to a position sealing chamber 77 from hole 45.

As indicated above, other embodiments of the present invention may include an injector or an injector/accumulator combination in one or both of pressure zones 48 and/or 51. Since ports 60 and 70 to the first and third zone respectively are located in removable flanges 14 and 72, the number of ports to either of these zones can be changed by changing only the respective flange and without necessitating changes to the majority of the components of seal cartridge 65.

A sealing apparatus 65 constructed as per FIG. 1 and using a pressure within central sealing chamber pressure zone 40 of approximately 800 psi has been used during in-house testing with a valve having no primary seal (such as seal 10) and containing helium at approximately 700 psi, with the apparatus under water to allow easy detection of helium leakage, for approximately 30,000 cycles of valve openings and closings, without any leakage of helium being detected. An easily sealable, high viscosity sealing medium was used. Helium is one of the most difficult substances to contain within a rotary seal because of its small molecular size and was therefore chosen for testing purposes.

It will be appreciated by a person skilled in the art that the pressure zones may be charged with sealing mediums having varying viscosities. The sealing ability is based upon the principle that no flow occurs from a zone of lower pressure to one of higher pressure and is, therefore, independent of the particular sealing properties of the sealing medium itself. For instance, helium, a very light gas, could be used in a pressure zone at a pressure higher than product pressure to effect a zero product leakage seal. Alternatively, a more easily sealable substance having a high viscosity, such as semi-fluid plastic may be used as a sealing medium.

Viscosity is generally defined as internal friction due to molecular cohesion in fluids. Viscosity is often compared on the basis of its coefficient of viscosity which is the value of the tangential force per unit area which is necessary to maintain unit relative velocity between two parallel planes a unit distance apart. Values of coefficients of viscosity in c.g.s. units for various possible sealing mediums include water 0.01, glycerine @6 deg. centigrade 62.6, and air 0.00018. C.g.s. coefficient of viscosity units are also referred to as poise units. An approximate range of coefficients of viscosity in poise units for a preferred embodiment of the present invention may range from 0.00010 to 70. Due to the large, almost infinite, number of possible sealing media at various temperatures which could be used, only an approximate range of possible viscosity coefficients can be given. Using a viscous sealing medium allows excellent sealability in a pressurized zone. On the other hand, when necessary to avoid the slightest contamination, the product fluid itself may be used at a higher pressure to avoid emission leakage past a seal, e.g. in zone 48, with a more viscous, but environmentally acceptable, fluid being used in zone 40 and/or zone 51. Choice of sealing medium may also be affected by other factors, such as avoidance of corrosion. Generally, fluids are presumed to include gases as well as liquids, and the range of fluid sealing media contemplated for use with apparatus 65 also includes semi-fluid plastic sealing media as well as gasses.

Figure 5:
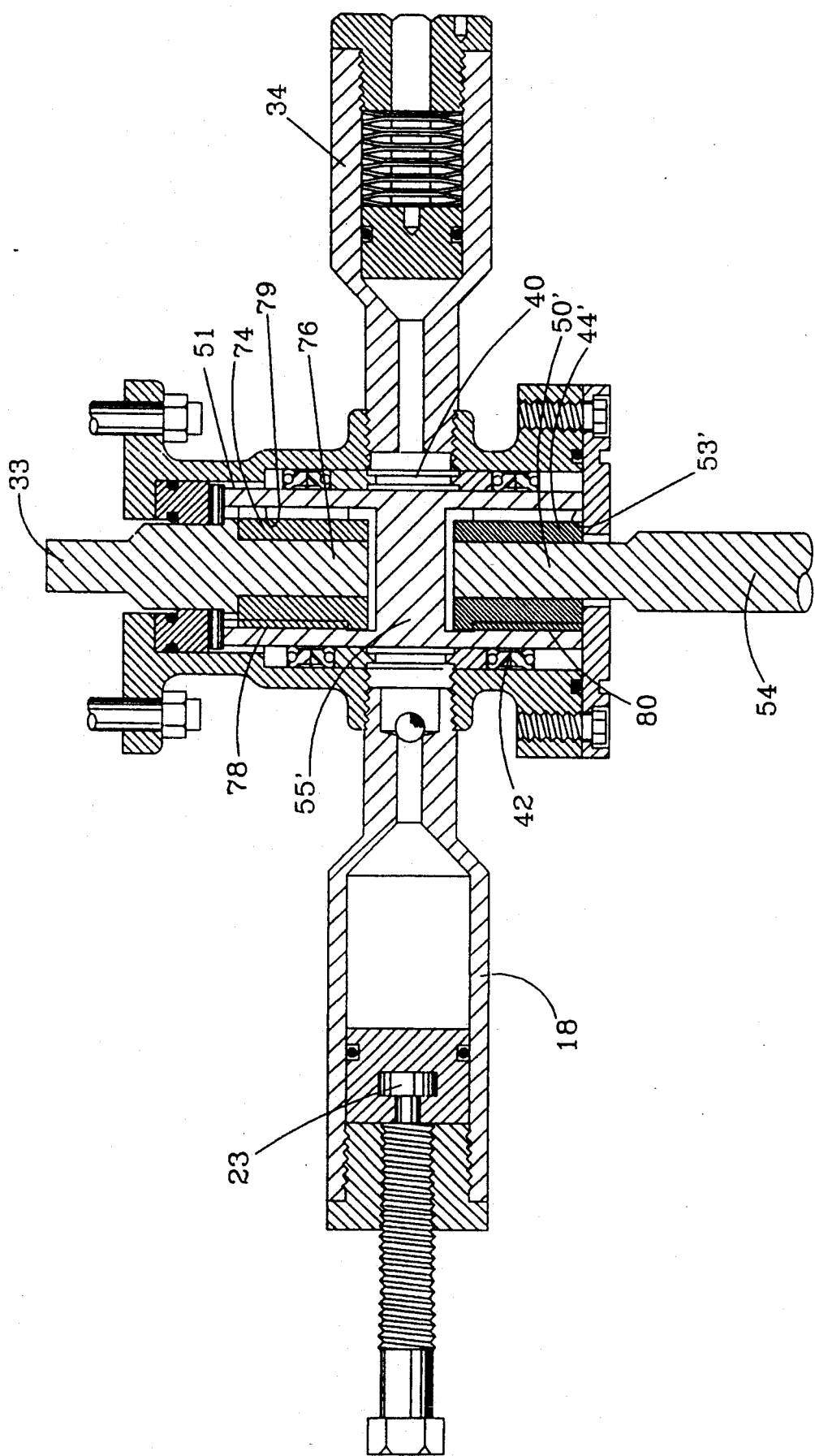

FIG. 5 illustrates an alternative method for coupling to an actuator shaft output portion 33 having a key portion 76. Parts identical to corresponding parts of the first embodiment have been given like reference numerals. Parts somewhat analogous, but not identical to, corresponding parts of the first embodiment have been given like numerals plus the notation "'" (prime). A second socket 79 in rotatable member 55 carries actuator shaft adaptor 74 fixed to shaft portion 76 for joint rotation by key 78. In this embodiment, various size actuator shafts can be accommodated by changing actuator shaft adaptor 74, which is removable in this embodiment. Similarly, the adapter 44' fixed to upper valve shaft portion 50' in first socket 53' is connected to member 55' for joint rotation by key 80.

FIG. 6 shows a schematic of a system for emission control from around valve stems of a number of valves including valve 63 controlled by actuator 32 and any number of other similar valves in a plant or system. In the simplified example of FIG. 6, two additional valves 63a and 63b are shown, with respective actuators 32a and 32b. For the first valve 63, four pressure sensors, labeled as Pa1, Pb1, Pc1, and Pd1, respectively, measure and transmit readings of the four pressure zones 51, 40, 48 and 56, to a computer controller 114. Pa2, Pb2, Pc2, and Pd2 represent pressure sensors for equivalent zones in valve 63a.

So long as the product pressure, determined by sensor Pa1, is less than the pressure in at least one other zone, product leakage cannot occur. Such a result of comparison of pressures may be indicated at status readout 116. The pressure sensors could also include sniffers or other types of sensors that might be used to detect leakage through a seal. Computer controller 114 may also activate pressurization through injector system 112. System 112 would include a central automatic control means, e.g. electrical, connected by lines such as 106, 108, 110 to respective injectors such as 18, but modified for automatic electrical operation, rather than manual operation, in any suitable manner as apparent to one of skill in the art. For simplification of the drawing, only one exemplary injector is shown at 18'.

Where a zone is used for both injection of sealing fluid and pressure sensing, this can be accomplished in any one of several ways, as will be apparent to one of skill in the art. For example, since, as mentioned above, the position of accumulator shaft 81 is indicative of pressure, "pressure sensor" Pc1 could be an optical, magnetic, or other device attached to the accumulator at 38 and operative to sense the position of shaft 81. Alternatively, a conventional pressure sensor could be communicated with the zone in question through a bore in the injector housing 18 or the accumulator housing 34. In still other embodiments, a third bore could be provided in cartridge housing 17 (or flange 14 or flange 72, depending on which zone is to be tested) for direct receipt of a pressure sensor. Such bore could be plugged if not used in a given installation.

As for any zones in which there is no sealant injected in a given installation, a pressure sensor could be installed directly in a cartridge bore such as 60.

It will be appreciated that various modes of operation are available for the system of FIG. 6. Various pressure chambers may be kept continuously charged for prevention of emission leakage past their respective seals. Alternatively, various pressure chambers may be kept unenergized until a sensor associated with the pressure chamber senses pressure or process fluid in the chamber indicating leakage past a seal. The sealing medium could then be loaded into the pressure chamber to effect generally zero leakage sealing until the next scheduled downtime. This system could also be used to provide a backup seal system to keep the plant operating when leakage is observed, even if it is a "safe" fluid, such as water, which is leaking. This would enable system pressure to be maintained and processing to continue.

Figure 7:
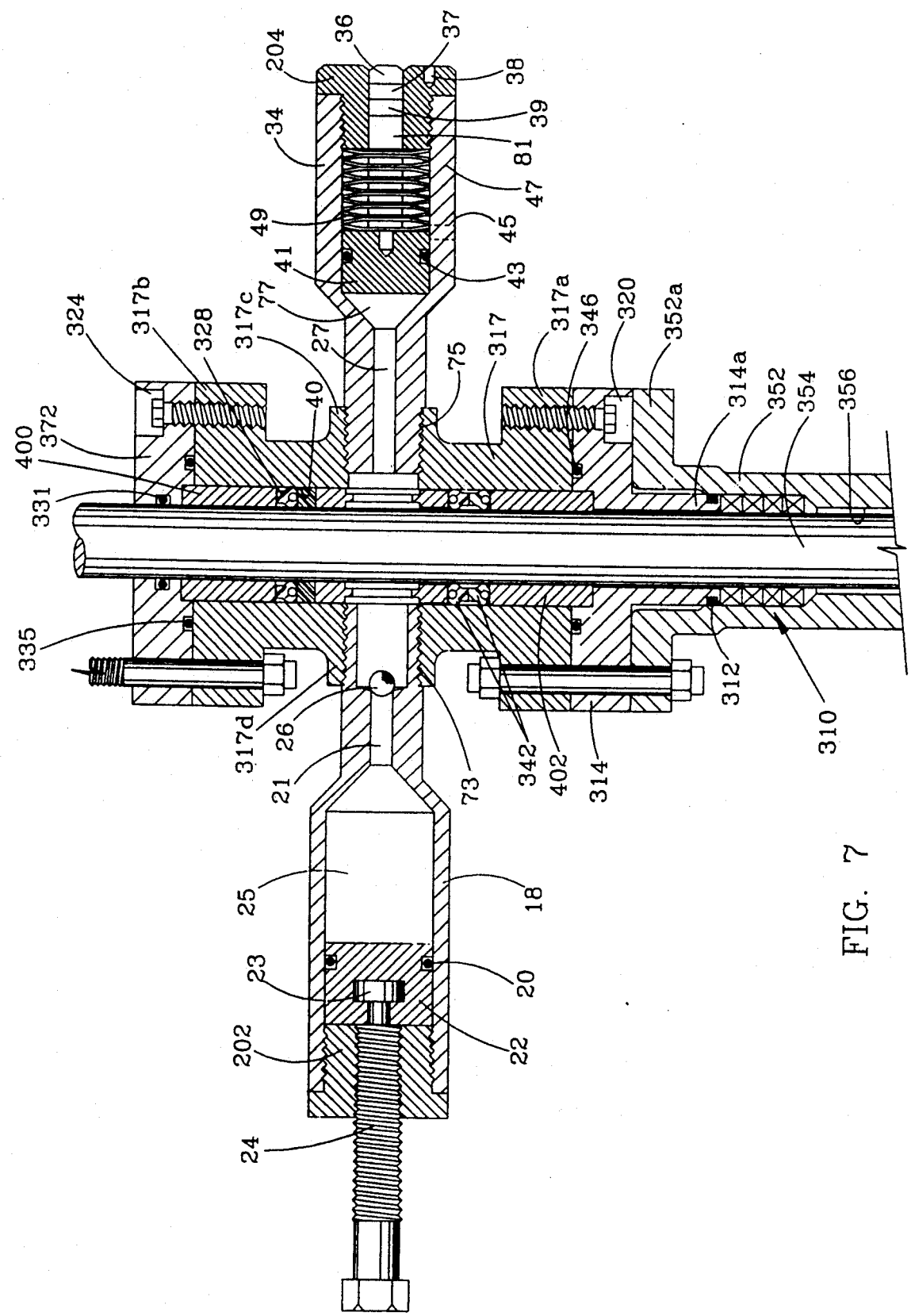
FIG. 7 is a view similar to that of FIG. 2 showing an embodiment of the invention adapted for linear actuated valves.

In the embodiments described thus far, the valve being sealed is of a rotary actuated type. This could be a valve which is itself a rotary type, e.g. a butterfly valve, or a gate valve which is rotary actuated. FIG. 7 is a view similar to that of FIG. 2 showing how the invention can be adapted for linear actuated valves, e.g. gate valves actuated by linear or longitudinal movement alone.

For simplicity, there is shown a single continuous shaft 354 which comprises the reciprocating valve stem and the extension thereof which extends upwardly through the sealing assembly and into the actuator (not shown). Those of skill in the art will appreciate that other arrangements are possible. The upper portion of the valve housing is shown. It includes an upstanding neck 352 with a flange member 352a extending radially outwardly from its upper end.

The cartridge body includes a central main housing portion 317 having integrally formed lower and upper flange portions 317a and 317b extending radially outwardly therefrom, as well as removable lower and upper flanges 314 and 372. Each of these flanges is annular, for passage of the shaft 354 therethrough, and is removably connected to the respective adjacent flange part 317a by respective screws 320 and 324. The lower flange 314 has a downwardly depending central cylindrical part 314a which extends into the valve body neck 352, and is sealed with respect thereto by static o-ring type seal 312. Flange 317 carries a static o-ring type seal 346 in an annular groove in its upper surface for sealing against flange part 317a. Similarly, flange 372 carries a static o-ring type seal 335 in an annular groove in its lower surface for sealing against flange part 317b.

The central cartridge housing portion 317 has integrally formed fittings 317c and 317d which define threaded lateral ports through the cartridge housing. The port defined by fitting 317d receives an injector housing 18 which, along with the parts carried thereby, is identical to the like-numbered parts of FIG. 2, and will not be described in detail. Similarly, the threaded port defined by fitting 317c receives an accumulator housing 34 which, with its associated parts, is identical to the like-numbered parts in FIG. 2.

Because of the different nature of the valve of the embodiment of FIG. 7, and the simple and direct nature of its interconnection with its respective actuator, the internal parts of the sealing assembly can be simplified. There is no need for special cartridge parts for interconnecting the valve stem to the shaft of the actuator. Rather, the sealing assembly of FIG. 7 need only carry a pair of longitudinally spaced bushings 400 and 402, for centering and guiding the shaft 354, the various rotary seals which divide the device into various pressure zones, as in the preceding embodiments, the central lantern ring, and the adjacent spacer ring.

As in the preceding embodiments, the product zone 356 is sealed from the cartridge body by a stack of annular seals 310 sealing between the shaft 354 and the valve housing neck 352. A first pressure zone in the cartridge is defined between these seals 310 and a stack of two seals 342 which seal between cartridge housing 317 and shaft 354 just above the lower bushing 402. The next pressure zone is defined between seals 342 and annular seal 328, just below upper bushing 400, and is the zone to which injector 18 and accumulator 34 are communicated. The final pressure zone is defined between seal 328 and an o-ring 331 sealing between shaft 354 and flange 372. All these seals 310, 342, 328, and 331 are "dynamic" or "movable" in that they seal between two relatively moving parts, i.e. the shaft 354 and one or another of the housing parts.

Except for the differences described just above, and the fact that the shaft 354 reciprocates, rather than rotating, the operation of the embodiment of FIG. 7 is identical to that of the preceding embodiments. Specifically, it can be incorporated into a system such as that shown in FIG. 6, but involving linear actuated valves, rather than rotary actuated valves.

All the embodiments described above are highly versatile and adaptable in terms of the ways in which the various pressure zones defined therein can be used, as described above. In addition, the more general concept of the invention is versatile in that it can readily be incorporated into separate cartridges, as shown in the drawings hereto, for retrofitting existing valves, but can also easily be designed into the housings of new valves and/or valve actuators.

Furthermore, even though an embodiment as described above generally includes one to three pressure zones, an increased number of pressure zones can be used to implement the present invention. Also the present invention may utilize a seal such as seal 10 and a single seal in cartridge housing 17 such as seal 28 to create a sealing chamber therebetween for creating a pressure zone containing sealing medium under a higher pressure than that of the product pressure in pressure zone 56 within valve housing 52.

In summary, the shaft seal apparatus can provide multiple pressure zones which have sealing/measuring capability that give great flexibility for means to eliminate or greatly reduce leakage of a process fluid in primary devices, such as valves, to the atmosphere. It could also be used to seal devices other than valves.

The sealing apparatus of the present invention and many of its attendant advantages will be understood from the foregoing description and it will be apparent that various changes may be made in the form, construction, and arrangement of the parts thereof without departing from the spirit and scope of the invention or sacrificing all of its material advantages, the forms hereinbefore described being merely exemplary embodiments thereof.

What is claimed is:

1. A sealing cartridge removably attachable to a housing having a process pressure zone containing a product under a first pressure, said housing having a through aperture surrounding a movable shaft, said sealing cartridge comprising:

(a) a cartridge body having first and second ends with first and second openings, respectively, said cartridge body being removably attached to said housing, with said first opening coaxially aligned with said aperture, and forming a static fluid-tight seal with said housing;

(b) a shaft extension within said cartridge body and exiting said cartridge body second end through said second opening;

(c) spaced first and second annular seals each having an inner diameter slidably sealing said shaft extension and an outer diameter sealing said cartridge body to form a sealing pressure zone between said first and second seals, while permitting relative movement between the shaft extension and the cartridge body, the first and second seals being adapted to be activated by pressure in said sealing zone;

(d) means for selectively introducing a fluid sealing medium into said sealing pressure zone at a second pressure higher than said first pressure and adapted to prevent back flow from the sealing pressure zone;

(e) an accumulator comprising an accumulator housing connected to the cartridge body and defining an accumulator chamber communicating with the sealing pressure zone, the accumulator further comprising a member movable to expand and contract the accumulator chamber and adapted to provide an indication of its position, the movable member being resiliently biased to resist expansion;

whereby: when there is adequate sealing pressure in the sealing zone, the movable member will overcome its resilient bias to expand the accumulator chamber, and the resilient bias will act to maintain the pressure in the sealing zone; and when the pressure in the sealing zone drops, the resilient bias will move the movable member to contract the accumulator chamber, and the position so indicated will alert an operator to the need for corrective measures.

2. The sealing cartridge of claim 1, wherein said second seal is adapted to cooperated with a third annular seal disposed within said housing and movably sealing said shaft to form one auxiliary pressure zone between said process and sealing pressure zones;

and further comprising means for introducing fluid into said one auxiliary pressure zone via said cartridge body at a pressure higher than said first pressure.

3. The sealing cartridge of claim 2, further comprising:

a fourth annular seal movably sealing said shaft extension and spaced from said first seal in a direction toward said second end of said cartridge body, said fourth seal and said first seal forming another auxiliary pressure zone; and means for introducing sealing medium into said other auxiliary pressure zone at a pressure higher than said first pressure.

4. The sealing cartridge of claim 3, further comprising:

at least one sensor operative to detect a variable indicative of either one of pressure and product leakage, said sensor being associated with a port through said cartridge body communicating with one of said pressure zones.

5. The sealing cartridge of claim 3, wherein:

a first sealing medium is used in one of said pressure zones, and a second sealing medium of different composition than said first sealing medium is used in another of said pressure zones.

6. The sealing cartridge of claim 2, wherein the means for introducing sealing medium into the sealing and auxiliary pressure zones each comprises:

a respective injector housing connected to said cartridge body and defining an injector chamber independently communicable with the respective pressure zone but closed from communication with the outside of the injector housing and containing a quantity of such sealing medium, and respective means for selectively and independently reducing the volume of the injector chamber to force sealing medium into the respective pressure zone.

7. The sealing cartridge of claim 6, wherein the sealing media in the injector chambers are of different compositions respectively.

8. The sealing cartridge of claim 1, wherein said means for introducing sealing medium comprises an injector housing connected to said cartridge body and defining an injector chamber communicable with said sealing pressure zone but closed form communication with the outside of the housing and containing a quantity of such sealing medium, and means for selectively reducing the volume of the injector chamber to force sealing medium into the sealing pressure zone.

9. The sealing cartridge of claim 8, wherein the means for reducing volume is adapted to force the quantity of sealing medium into the sealing pressure zone at a pressure higher than that outside the injector housing.

10. The sealing cartridge of claim 9, wherein the injector housing contains an injector piston defining one end of the injector chamber and the means for reducing volume comprises means for moving the injector piston independently of the ambient pressure outside the injector housing.

11. The sealing cartridge of claim 10, wherein the means for moving the injector piston is manually, mechanically operable.

12. The sealing cartridge of claim 10, wherein the injector comprises a check valve permitting fluid flow from the injector chamber into the sealing pressure zone but preventing back flow from the sealing pressure zone into the injector chamber.

13. The sealing cartridge of claim 12, wherein the movable member of the accumulator comprises an accumulator piston defining on one end of the accumulator chamber, the accumulator housing, on the opposite side of the accumulator piston from the accumulator chamber, being closed from communication with the outside of the accumulator housing.

14. The sealing cartridge of claim 13, further comprising indicator means carried on the accumulator piston and visible from the outside of the accumulator housing to show the position of the accumulator piston.

15. The sealing cartridge of claim 1, wherein said first and second seals are pressure energized.

16. The sealing cartridge of claim 1, further comprising:

a removable adaptor for interconnecting said shaft and said shaft extension together; and a removable flange at said first end of said cartridge body for connecting said cartridge body to said housing.

17. A shaft seal assembly, comprising:

(a) main housing means defining a process pressure zone for containing a fluid product under a first pressure and a central sealing chamber longitudinally spaced from said first pressure zone;

(b) a shaft movably mounted in said main housing means and extending from said process pressure zone into and through said central sealing chamber;

(c) a primary annular seal sealing between said shaft and said main housing means for preventing leakage from said process pressure zone toward said central sealing chamber;

(d) at least one annular secondary seal having an inner diameter slidably sealing against said shaft and an outer diameter sealing against said main housing means distal said process pressure zone, whereby said central sealing chamber defines a sealing pressure zone between said primary and secondary seals;

(e) an injector for introducing sealing medium into said sealing pressure zone, at a second pressure higher than said first pressure, comprising an injector housing connected to the main housing means and defining an injector chamber communicable with the sealing pressure zone, but closed from pressure communication with the outside of the injector housing and with said process pressure zone, and containing a quantity of such sealing medium, means for selectively reducing the volume of the injector chamber to force sealing medium into the sealing pressure zone, and a check valve permitting fluid flow from the injector chamber into the sealing pressure zone but preventing back flow from the sealing pressure zone into the injector chamber; and (f) an accumulator comprising an accumulator housing defining an accumulator chamber communicatively connected to the sealing pressure zone, the accumulator further comprising a member movable to expand and contract the accumulator chamber and adapted to provide an indication of its position, the movable member being resiliently biased to resist expansion;

whereby: when there is adequate sealing pressure in the sealing zone, the movable member will overcome its resilient bias to expand the accumulator chamber, and the resilient bias will act to maintain the pressure in the sealing zone; and when the pressure in the sealing zone drops, the resilient bias will move the movable member to contract the accumulator chamber, and the position so indicated will alert an operator to the need for corrective measures.

18. The seal assembly of claim 17, wherein said main housing means comprises a process housing generally defining said process pressure zone and a cartridge body releasably connected and statically sealed to the process housing and at least partially defining said central sealing chamber.

19. The seal assembly of claim 18, wherein said shaft is rotatable.

20. The seal assembly of claim 19, wherein said shaft is rotatable and comprises a main portion disposed generally in said process housing, and a shaft extension, releasably connected to said main portion for joint rotation therewith, said shaft extension being disposed generally in said cartridge body and extending outwardly from the cartridge body distal the process housing, for connection to an external device.

21. The seal assembly of claim 20, wherein said main portion of said shaft is so connected to said shaft extension by a removable adaptor mounted in said cartridge body.

22. The seal assembly of claim 18, further comprising: a removable flange interconnecting said cartridge housing and said process housing.

23. The seal assembly of claim 18, wherein said primary seal is disposed in said main housing, and said secondary seal is disposed in said cartridge body.

24. The seal assembly of claim 17, wherein said shaft is longitudinally movable with respect to said main housing means.

25. The seal assembly, of claim 17, further comprising:

means for monitoring for product leakage into the sealing pressure zone.

26. The seal assembly of claim 17 adapted to be operable with sealing media having an approximate range of coefficients of viscosity in c.g.s. poise units from 0.00010 to 70.

27. A shaft seal assembly comprising:

(a) main housing means defining a process pressure zone for containing a fluid product under a first pressure and a central sealing chamber longitudinally spaced from said process pressure zone;

(b) a shaft movably mounted in said main housing means and extending from said process pressure zone into and through said central sealing chamber;

(c) a first annular seal sealing between said shaft and said main housing means for preventing leakage from said process pressure zone toward said central sealing chamber;

(d) a second annular seal having an inner diameter sealing against said shaft and an outer diameter sealing against said main housing means distal said process pressure zone, (e) a third annular seal having an inner diameter sealing against said shaft and an outer diameter sealing against said main housing means, and disposed between said first and second seals whereby a sealing pressure zone is defined between said second and third seals, and one auxiliary pressure zone is defined between said first and third seals;

(f) an injector for introducing sealing medium into said sealing pressure zone at a second pressure higher than said first pressure and higher than that outside the injector housing, comprising an injector housing connected to the main housing means and defining an injector chamber communicable with the second pressure zone but closed from communication with the outside of the injector housing and containing a quantity of such sealing medium, means for selectively reducing the volume of the injector chamber to force sealing medium into the second pressure zone, and a check valve permitting fluid flow from the injector chamber into the sealing pressure zone but preventing back flow from the sealing pressure zone into the injector chamber;

(g) an accumulator comprising an accumulator housing defining an accumulator chamber communicatively connected to the sealing pressure zone the accumulator further comprising a member movable to expand and contract the accumulator chamber and adapted to provide an indication of its position, the movable member being resiliently biased to resist expansion;

whereby: when there is adequate sealing pressure in the sealing zone, the movable member will overcome its resilient bias to expand the accumulator chamber, and the resilient bias will act to maintain the pressure in the sealing zone; and when the pressure in the sealing zone drops, the resilient bias will move the movable member to contract the accumulator chamber, and the position so indicated will alert an operator to the need for corrective measures;

(h) another such injector associated with said auxiliary pressure zone, the injectors being independently operable; and (i) another such accumulator associated with the auxiliary pressure zone, the accumulators being independent of each other.

28. The seal assembly of claim 27, further comprising:
a fourth annular seal sealing between said shaft and said main housing means on the opposite side of said second seal from said third seal whereby another auxiliary pressure zone is defined between said second and fourth seals;
a further such injector associated with the other auxiliary pressure zone and operable independently of the other injectors;
and a further such accumulator associated with the other auxiliary pressure zone and independent of the other accumulators.

29. The seal assembly of claim 20, further comprising:
means for monitoring for leakage into said other auxiliary pressure zone.

30. The seal assembly of claim 27, wherein said second and third seals are self-energizing.

31. A system for on-line emission reduction comprising at least one valve assembly having a valve housing defining a process pressure zone.
a housing extension communicatively adjoining the valve housing and extending away from the valve housing toward an actuator,
a valve shaft disposed partially in the valve housing and extending through the housing extension,
a first annular seal in the valve housing sealing between the valve housing and the valve shaft,
a second annular seal in the housing extension spaced from the first seal and having an inner diameter sealing against the valve shaft and an outer diameter sealing against the housing extension,
a third annular seal in the housing extension spaced from the second seal and on the opposite side of the second seal from the first seal,
whereby a sealing pressure zone is defined between the second and third seals, and an auxiliary pressure zone is defined between the first and second seals;
an injector with a self-contained quantity of sealing fluid communicatably connected with one of said sealing or auxiliary pressure zones, and having means for selectively injecting the sealing fluid into the one pressure zone at a pressure higher than that in the process pressure zone, and adapted to prevent back flow from the seal at the outer end of the one pressure zone being energized by virtue of pressure in the one zone;
an accumulator comprising an accumulator housing defining an accumulator chamber communicatively connected with the one pressure zone, the accumulator further comprising a member movable to expand and contract the accumulator chamber and adapted to provide an indication of its position, the movable member being resiliently biased to resist expansion;
whereby: when there is adequate sealing pressure in the one zone, the movable member will overcome its resilient bias to expand the accumulator chamber, and the resilient bias will act to maintain the pressure in the one zone; and
when the pressure in the one zone drops, the resilient bias will move the movable member to contract the accumulator chamber, and the position so indicated will alert an operator to the need for corrective measures;
and leak detection means for detecting leakage from said process pressure zone.

32. A system for on-line emission reduction as recited in claim 31, further comprising:
a second such valve with respective such injector accumulator, and leak detection means.

33. A system for on-line emission reduction as recited in claim 32, wherein:
each leak detection means comprises a pressure sensor connected to a port in communication with the respective one pressure zone distal the injector so that, if said injector becomes clogged, said pressure sensor will still have an accurate reading.

34. A system for on-line emission reduction as recited in claim 32, wherein:
said pressure sensors are adapted to produce electronic signals indicative of the pressures they sense, and said means for monitoring comprises a computer electronically connected to the pressure sensors and adapted to receive and compare their signals.

35. A system for on-line emission reduction as recited in claim 34, wherein:
said injectors are electronically controlled by said computer.

36. A system for on-line emission reduction as recited in claim 34, wherein:
said injectors are electronically activatable, said computer being operatively connected to each such injector and adapted to convey an activating signal to the injector if such comparison indicates product pressure exceeds pressure in the injector's respective pressure zone.

37. A system for on-line emission reduction as recited in claim 31, wherein:
said injector is adapted to inject sealing medium by supplying gas pressure to a first side of an injector piston, said gas having a regulated pressure, a second side of said injector piston pressing said sealing medium into said one pressure zone at said regulated pressure.

38. The system of claim 31, wherein said leak detection means comprises means for monitoring and comparing the pressures in the process and sealing pressure zones.

39. The system of claim 31, wherein the housing extension has ports communicating with the auxiliary pressure zone and adapted, alternatively, to removably receive plugs, leak detection means and injectors.

* * * * *

UNITED STATES PATENT AND TRADEMARK OFFICE
CERTIFICATE OF CORRECTION

PATENT NO. : 5,244,183
DATED : September 14, 1993
INVENTOR(S) : Douglas G. Calvin and Edward G. Holtgraver It is certified that error appears in the above-identified patent and that said Letters Patent is hereby corrected as shown below:

In column 11, line 28, change "cooperated" to --cocperate--.

In column 12, line 10, change "form" to --from--.

In column 14, line 22, change "zone," to --zone;--.

In column 14, line 48, insert "," after "zone".

In column 15, line 16, change "20" to --28--.

Column 15, line 23, change "zone." to --zone,--

In column 15, line 47, insert "the one zone," after "from".

Signed and Sealed this

Twenty-second Day of March, 1994

Attest:

BRUCE LEHMAN

Attesting Officer     Commissioner of Patents and Trademarks